United States Patent
Li et al.

(10) Patent No.: US 8,428,653 B2
(45) Date of Patent: Apr. 23, 2013

(54) HOT-SPOT WIRELESS ACCESS EXPLOITING SHADOWING DIVERSITY OF DISTRIBUTED ANTENNAS

(75) Inventors: Ye Li, Marietta, GA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1423 days.

(21) Appl. No.: 12/058,954

(22) Filed: Mar. 31, 2008

(65) Prior Publication Data

US 2009/0247067 A1 Oct. 1, 2009

(51) Int. Cl.
| | |
|---|---|
| *H04B 1/00* | (2006.01) |
| *H04B 15/00* | (2006.01) |
| *H04B 7/02* | (2006.01) |
| *H04W 4/00* | (2009.01) |
| *H04W 36/00* | (2009.01) |
| *H04M 1/00* | (2006.01) |
| *H04J 1/00* | (2006.01) |
| *H04L 1/02* | (2006.01) |

(52) U.S. Cl.
USPC ............. 455/562.1; 455/63.1; 455/422.1; 455/442; 370/334; 370/343; 375/267

(58) Field of Classification Search ............. 455/7, 13.3, 455/14, 63.1, 422.1, 522, 562.1; 370/334, 370/335, 338; 375/141, 148, 260, 267, 299
See application file for complete search history.

(56) References Cited

U.S. PATENT DOCUMENTS

| | | | | |
|---|---|---|---|---|
| 7,286,507 | B1 * | 10/2007 | Oh et al. | 370/334 |
| 7,929,408 | B2 * | 4/2011 | Lee et al. | 370/203 |
| 8,112,038 | B2 * | 2/2012 | Li et al. | 455/63.1 |
| 2008/0102881 | A1 * | 5/2008 | Han et al. | 455/522 |
| 2010/0279729 | A1 * | 11/2010 | Hui et al. | 455/522 |

OTHER PUBLICATIONS

Tarighat, Mirette Sadek, and Ali H. Sayed; A multi user beamforming scheme for downlink MIMO channels based on maximizing signal-to-leakage ratios; by Alireza; Mar. 18-23, 2005. IEEE; ICASSP 2005; pp. III-1129 to III-1132.*

Mirette Sadek, Alireza Tarighat and Ali H. Sayed, "Active Antenna Selection in Multiuser MIMO Communications", Apr. 2007, IEEE Transactions on Signal Processing, vol. 55, No. 4, pp. 1498-1510.*

Rana A. Abdelaal, Mahmoud H. Ismail and Khaled Elsayed, "Resource Allocation Strategies Based on the Signal-to-Leakage-plus-Noise Ratio in LTE-A CoMP Systems", 2012, IEEE Wireless Communications and Networking Conference: MAC and Cross-Layer Design, pp. 1590-1595.*

* cited by examiner

*Primary Examiner* — Zhiyu Lu
*Assistant Examiner* — Paul P Tran
(74) *Attorney, Agent, or Firm* — Gene Vinokur; Dirk Brinkman (57) ABSTRACT

The embodiments of the invention describe method and system for maximizing capacity of a distributed antenna system. A relaying antenna is selected to maximize a signal-to-leakage ratio (SLR) ratio of the distributed antenna system. Further, the capacity of the system is improved by allocating a signal power based on a pseudo-capacity criterion such that an average pseudo capacity of the distributed antenna system is maximized.

8 Claims, 6 Drawing Sheets

Step (i): *Initialization:*

$$\mathbf{p}^{(0)} = \mathbf{1}P_t.$$

Step (ii): *Iteration:* for $i = 1, 2, \cdots,$ $$C_{pc}^{(i-1)} = \frac{1}{10}\sum_{k=1}^{10}\log_2\left(1 + \frac{\beta_{m,k}P_k^{(i-1)}}{\sum_{j\neq k}\beta_{m,k}P_j^{(i-1)} + \sigma_N^2}\right)$$

$$\Delta\tilde{\mathbf{p}}^{(i)} = \begin{pmatrix}\frac{\partial C_{pc}^{(i-1)}}{\partial p_1} \\ \vdots \\ \frac{\partial C_{pc}^{(i-1)}}{\partial p_{10}}\end{pmatrix}$$

$$\Delta\mathbf{p}^{(i)} = \begin{cases}\Delta\tilde{\mathbf{p}}^{(i)}, & \text{if } \|\Delta\tilde{\mathbf{p}}^{(i)}\| \leq \delta_1, \\ \frac{\Delta\tilde{\mathbf{p}}^{(i)}}{\|\Delta\tilde{\mathbf{p}}^{(i)}\|}, & \text{if } \|\Delta\tilde{\mathbf{p}}^{(i)}\| > \delta_1,\end{cases}$$

and $$\tilde{\mathbf{p}}^{(i)} = \tilde{\mathbf{p}}^{(i-1)} + \mu\Delta\mathbf{p}^{(i)}.$$

Step (iii): *Checking Constraint:*

$$\hat{p}_k^{(i)} = \begin{cases}\tilde{p}_k^{(i)}, & \text{if } \tilde{p}_k^{(i)} > \delta_2, \\ \delta_2, & \text{if } \tilde{p}_k^{(i)} \leq \delta_2,\end{cases}$$

for $k = 1, \cdots 10$, and $$\mathbf{p}^{(i)} = \frac{P_t}{\text{mean}(\hat{\mathbf{p}}^{(i)})}\hat{\mathbf{p}}^{(i)}.$$

Step (iv): *Repeating Steps* (ii) and (iii) if $\|\mathbf{p}^{(i)} - \mathbf{p}^{(i-1)}\| \leq \delta_3$.

HOT-SPOT WIRELESS ACCESS EXPLOITING SHADOWING DIVERSITY OF DISTRIBUTED ANTENNAS

FIELD OF THE INVENTION

This invention relates generally to hot-spot wireless access with distributed antennas, and more particularly to a system and method for selecting antennas and allocating desired signal power.

BACKGROUND OF THE INVENTION

A hot-spot is a venue that offers WiFi access. Hot-spot wireless access is required by number of mobile devices, e.g., a laptop, Wi-Fi phone, or other device suitable to access the Internet. Of the estimated 150 million laptops, 14 million personal digital assistants (PDAs), and other emerging Wi-Fi devices sold per year for the last few years, most include the Wi-Fi feature. One of the critical tasks of hot-spot wireless access is to serve mobile devices crowded in a small area while the available wireless spectrum is limited.

Distributed Antenna System

To improve the throughput of hot-spot wireless access, distributed antenna system has been utilized. A Distributed Antenna System (DAS) is a network of spatially separated antennas connected to a common source via a transport medium that provides wireless service within a geographic area or structure.

Figure 1:
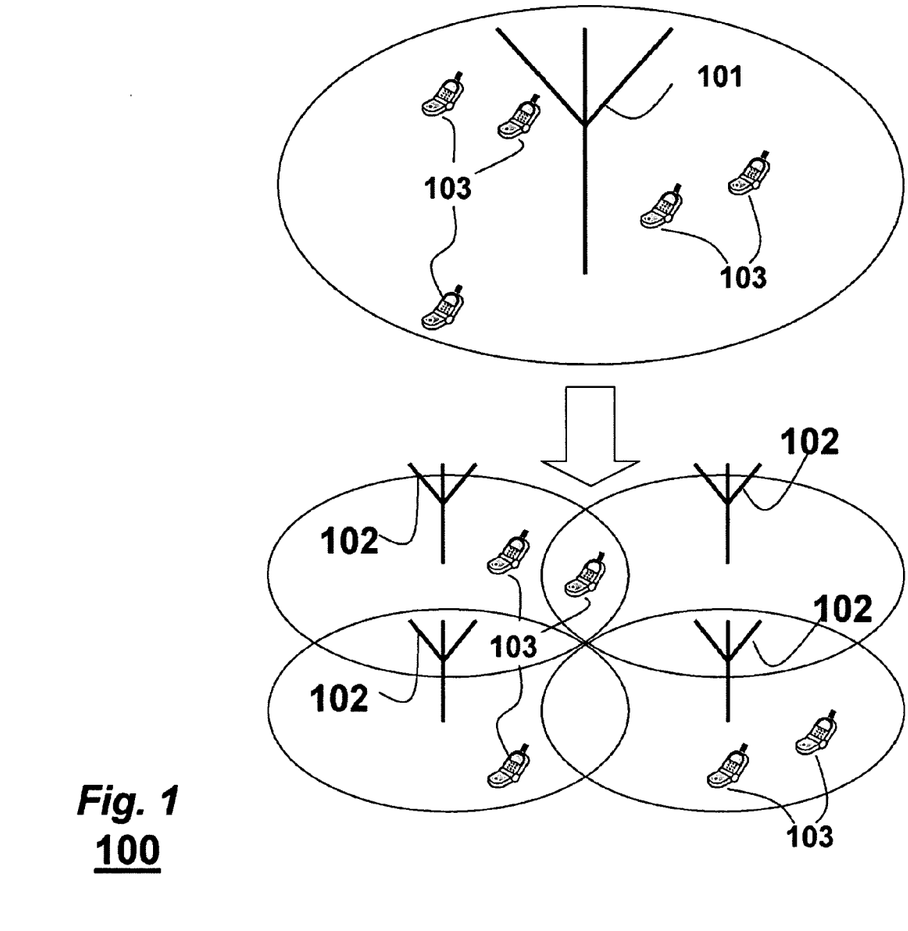
FIG. 1 is a schematic of a distributed antenna system used by embodiments of the invention.

FIG. 1 show an example of a distributed antenna system. The distributed antenna system partitions the transmitted power of antenna 101 among several antenna elements 102, separated in space so as to provide coverage for the mobile devices 103 over the same area as a single antenna 101 but with reduced total power and improved reliability. It is desired to improve performance of distributed antenna selection, by taking into the consideration the desired signal and interference strength as well as signal power allocation.

The Signal-to-Interference-plus-Noise Ratio (SINR) is an important metric of wireless communication link quality. SINR estimates have several important applications. These include optimizing the transmit power level for a target quality of service, assisting with handoff decisions and dynamically adapting the data rate for wireless Internet applications. Accurate SINR estimation provides for both a more efficient system and a higher user-perceived quality of service.

Signal power allocation is an intelligent selection of transmit power in a communication system to achieve good performance within the system. The notion of "good performance" can depend on context and may include optimizing metrics such as link data rate, network capacity, geographic coverage and range, and life of the network and network devices, and network capacity. Signal power allocation methods are used in many applications, including cellular networks.

Usually, a higher transmit power translates into a higher signal power at the receiver. Having a higher signal-to-noise ratio (SNR) at the receiver reduces the bit error rate of a digital communication link.

However, the higher transmit power leads to increase of power consumption in the transmitting device. This is of particular concern in mobile devices, where battery life is reduced correspondingly. Also, interference to other mobile device in the same frequency band is increased proportionally to the signal power. In cellular spread-spectrum systems such as CDMA, where the mobile devices share a single frequency and are only separated by different spreading codes, the number of mobile devices that a cell can support as well as the size of the cell is typically limited by the amount of interference present in the cell. The increased interference therefore results in decreased cell capacity and size. Even in FDMA systems such as GSM where each mobile device in a cell uses a different frequency, interference is still present between different cells and reduces the amount of frequency reuse the network can support.

SUMMARY OF THE INVENTION

Embodiments of the invention describe a method and a system for an optimal antenna selection, which takes both desired signal strength and interference strength into consideration when selecting antennas. We will also describe a pseudo-capacity based power allocation approach.

A relaying antenna is selected to maximize a signal-to-leakage ratio (SLR) ratio of the distributed antenna system. Further, the capacity of the system is improved by allocating a signal power based on a pseudo-capacity criterion such that an average pseudo capacity of the distributed antenna system is maximized.

DETAILED DESCRIPTION OF THE PREFERRED EMBODIMENT

FIG. 1 shows a distributed antenna system (DAS) 100 used by embodiments of the invention. The system includes a set (one or more) of fixed antennas 102 suitable to relay a wireless signal to and from a set (one or more) of mobile device 103. The antennas 102 are connected to a common RF transceiver, e.g., a base station not shown, via a transport medium that provides wireless service within a relatively small geographic area or structure.

From time to time, antenna selection is performed for a mobile device 103. The mobile device 103 is the one which starts or continues to receive or transmit data packages through one of the antenna 102. The antenna selection could be performed once per communication session or for any or for every data package transmittal. The DAS 100 might have limited frequency band under limited space, e.g., in-door communications, data transmission in a wireless hot-spot football stadium.

Figure 2:
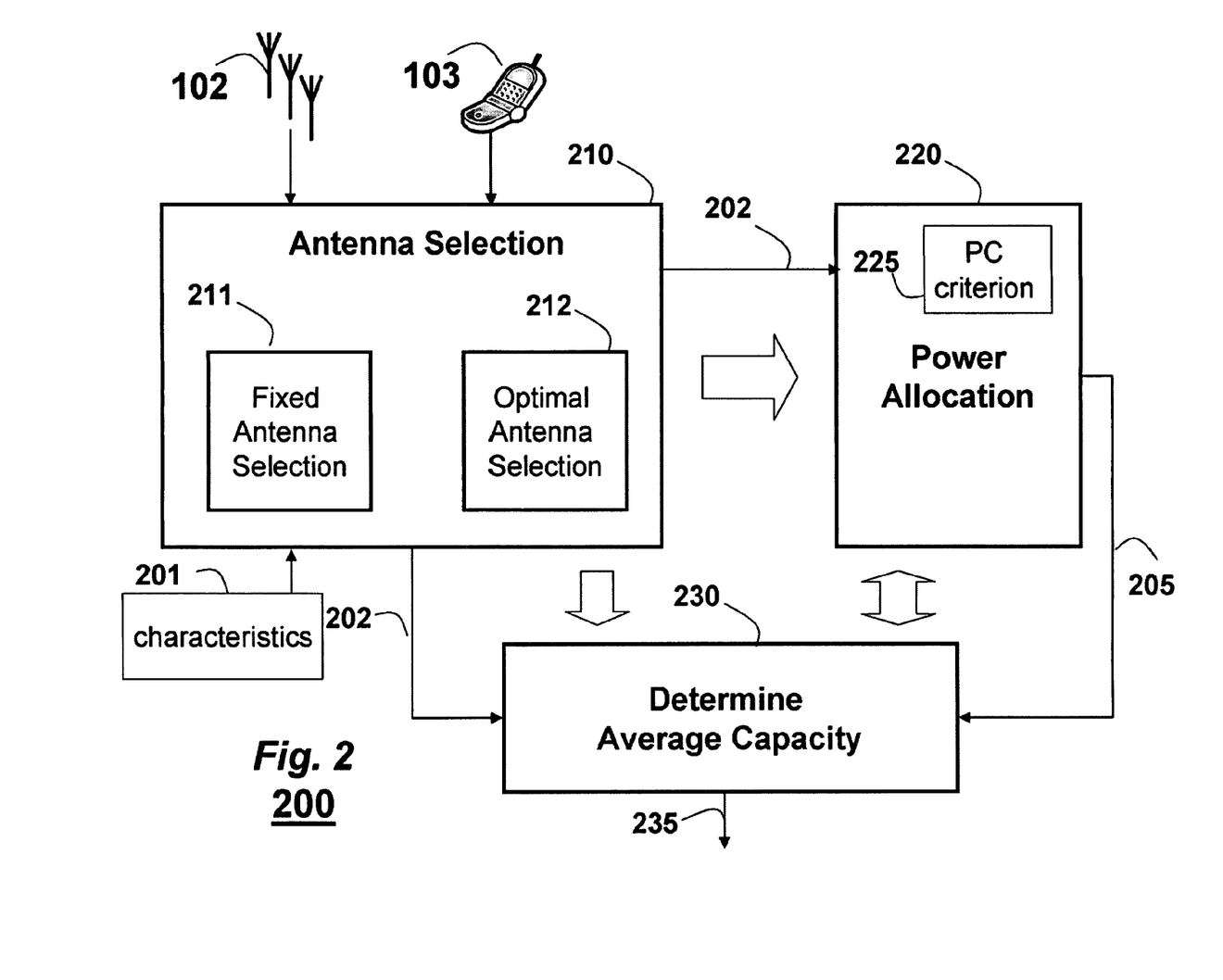
FIG. 2 is a block diagram of a method for antenna selection and signal power allocation according to embodiments of the invention.

FIG. 2 show a system and a method 200 according to embodiments of the invention. Characteristic 201 of the DAS 100, e.g., the antennas 102 configurations, distance between the antennas 102 and the mobile device 103, path loss, shadowing and multipath fading of the DAS 100, are inputs to the method 200. The objectives of the method 200 are to select 210 a relaying antenna 202 out of the set of antennas 102 to for a signal transmission to and from the mobile device 103 and to allocate 220 a signal power 205 for a transmitted signal such that an average capacity 230 of the DAS 100 is maximized.

Embodiments of the invention use a fixed antenna selection method 211 and an optimal antenna selection method 212 to select the relaying antenna 202. The relaying antenna 202 is used to determine 230 the average capacity 235 of the DAS 100. Alternatively, the relaying antenna 202 parameters, e.g., distance to the mobile device 103, could serve as an input to power allocation method 220, which determines the signal power 205 based on a pseudo-capacity (PC) criterion 225. Both the relaying antenna 202 and the signal power 205 could be used in determining 230 the average capacity 235 of the DAS 100. The average capacity 235 could be further used to determine or verify a necessary number of the antennas 102.

Wireless Propagation Model

Radio propagation can be characterized by three characteristics: path loss, shadowing, and multipath fading.

Path loss depends on the distance between a transmit antenna and a receive antenna. Denote $P_t$ and $\overline{P}_r$ as the transmitted signal power and the average received signal power, respectively. Pass loss L is defined as $$L = \frac{\overline{P}_r}{P_t}.$$

Or can be remodeled as $$L = K\frac{1}{d^\alpha},$$

where K is a constant determined by antenna configuration, d is a distance between a transmit antenna and a receive antenna, and $\alpha$ is the path loss exponent. The pass loss exponent, $\alpha$ is usually between 2, e.g., in free space, and 4, but depending on the transmit conditions could be as large as 6.

Due to path loss and shadowing, the actual received signal power can be expressed as $$P_r(dB) = \overline{P}_r(dB) + \epsilon(dB),$$

where $\epsilon$ is an effect of shadowing. The shadowing is modeled as normal distribution with variance $\sigma^2_s$. The variance $\sigma_s$ is usually between 4 dB and 10 dB and its typical value is 8 dB.

Radio signal also experiences multipath fading, which causes the received signal level changes quickly with time or position of the mobile device. The instantaneous power of the received signal is $$P = Pr|h|^2 = \beta|h|^2 P_t,$$

where h is a base-band complex channel gain and $\beta = L\epsilon$. The complex channel gain is frequently modeled as complex Gaussian with zero mean and unit variance. As a result, $|h|^2$ is with exponential distribution and is with unit average.

Both the shadowing and the multipath fading cause the signal power to change with time. However, time-varying due to shadowing is much slower than due to multipath. Therefore, some of the embodiments of the invention feed back the shadowing parameter $\epsilon$ to the transmitter for performance optimization, while instantaneous complex channel gain is not available at the transmitter.

Wireless Stadium

A wireless stadium hot-spot is an example application according to one embodiment of the invention. The wireless stadium example serves to illustrate the invention and in no way limits other applications of the invention. Should be noted that the embodiments of the invention could be used both in indoor and in outdoor environments.

Figure 3:
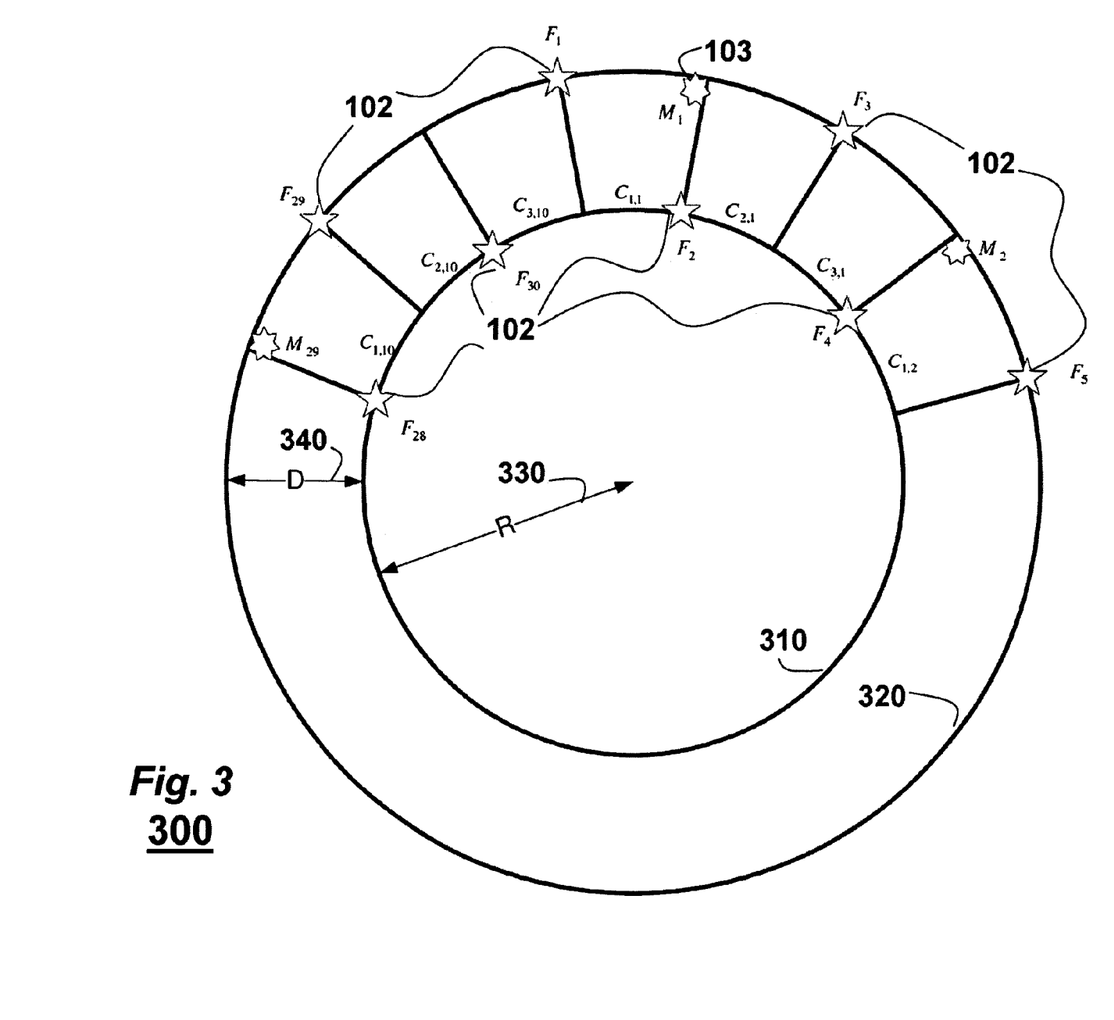
FIG. 3 is a schematic of a wireless stadium hot-spot example application according to an embodiment of the invention.

FIG. 3 shows the model of the stadium 300. The sports are played in the inner circle 310 with a radius 330 of R=150 meters. The audience is located between the outer 320 and the inner 310 circles and need wireless access so that they can track their favorite players clearly. The radius 340 difference between the two circles is D=30 meters.

The wireless stadium embodiment implements the DAS 100. The embodiments uses 30 access antennas 102 of the DAS 100 with, e.g., 15 antennas 102 uniformly distributed in the outer 320 circle and the other 15 in the inner 310 circles. The audience area is equally divided into 30 cells, which are marked $C_{n,k}$ for n=1, 2, 3 and k=1, . . . , 10. The available frequency set is equally divided into three different subsets and the 10 cells with the same first index, n, use the same frequency subset. Consequently, the same frequency may be used by as many as 10 cells simultaneously. It will cause multi-user interference (MUI) and the embodiments of the invention describe a system and a method for reducing MUI.

Without loss of generality, the embodiment only considers 10 cells using the same set of frequency, $C_{l,k}$'s for k=1, . . . 10, and those mobile devices in the edge of these cells, $M_k$ 103 for k=1, . . . 10. We denote $\beta_{mk}$ the power gain that takes path loss and shadowing into account and corresponds to the m-th transmit antenna, $F_m$ 250, and the mobile device, $M_k$ 103. Then the received signal $y_k$ at $M_k$ 103 can be expressed as $$y_k = \sum_{m \in \mathcal{M}} \sqrt{\beta_{mk}}\, h_{mk} s_{i_m} + n_k \quad (1)$$

where $\mathcal{M}$ the index set of access antennas 102 used to transmit at the same frequency simultaneously, $h_{mk}$ is the complex channel gain due to multipath fading, $s_{i_m}$ is the transmitted signal at access antenna $F_m$ for mobile device $i_m$, and $n_k$ is additive white Gaussian noise (AWGN).

Antenna Selection

Embodiments of the invention use a fixed antennas selection method that considers only pass loss phenomenon, and an optimal antenna selection method that considers pass loss, shadowing, and interference phenomena of wireless propagation.

Fixed Antenna Selection

In the fixed antenna selection (FAS) method 211 the closest to the mobile device 103 access relaying antenna 102 is selected. The FAS is optimal if there is no shadowing. Thus, mobile $M_k$ 103 will use antenna 102, $F_{m_k}$, where $$m_k = \begin{cases} 3(k-1)+2, & \text{if } k \text{ is odd,} \\ 3(k-1)+1, & \text{if } k \text{ is even.} \end{cases}$$

Therefore, the receive signal at mobile 103 $M_k$ can be expressed as $$y_k = \sqrt{\beta_{m_k k}}\, h_{m_k k} s_k + \sum_{i \neq k} \sqrt{\beta_{m_i k}}\, h_{m_i k} s_i + n_k. \quad (2)$$

The average signal power and interference-plus-noise power over multipath fading, $h_{mk}$, are $$P_S = \beta_{m_k k} p_k,$$

and $$P_I = \sum_{i \neq k} \beta_{m_i k} p_i + \sigma_N^2,$$

respectively, where $p_k = E|s_k|^2$, and $\sigma_N^2 = E|n_k|^2$.

If all access points transmit signals with the same power, i.e., $p_i = P_t$ for all i's, then signal-to-interference-plus-noise ratio will be $$SINR_k = \frac{\beta_{m_k k} P_t}{\sum_{i \neq k} \beta_{m_i k} P_t + \sigma_N^2}, \quad (3)$$

and the average capacity for FAS method 211 will be $$C_{FSE} = E\left\{\log_2\left(1 + \frac{\beta_{m_k k}|h_{m_k k}|^2 P_t}{\sum_{i \neq k} \beta_{m_i k}|h_{m_i k}|^2 P_t + \sigma_N^2}\right)\right\}. \quad (4)$$

In the Equation (4), the average is taken over all random variables, $\beta_{m_j k}$, consisting of constant pass loss and random shadowing fading, and complex Gaussian random variables with zero mean and unit variance $h_{m_j k}$.

Optimal Antenna Selection

In order to select access antennas considering shadowing parameters, for each mobile device 103 the SINR should be maximized. Thus, should be found a mapping from k to $m_k$ such that $SINR_k$ in Equation (3) is maximized for all k, where k is the index of the mobile device 103 and $m_k$ is the index of the access antenna 102 used by the k-th mobile set.

In one embodiment of the invention, we select relaying antenna 202 for each mobile device 103 to maximize signal-to-leakage ratio (SLR), $$SLR_k = \frac{\beta_{m_k k} P_t}{\sum_{i \neq k} \beta_{m_k i} P_t + \sigma_N^2}. \quad (5)$$

Figure 4:
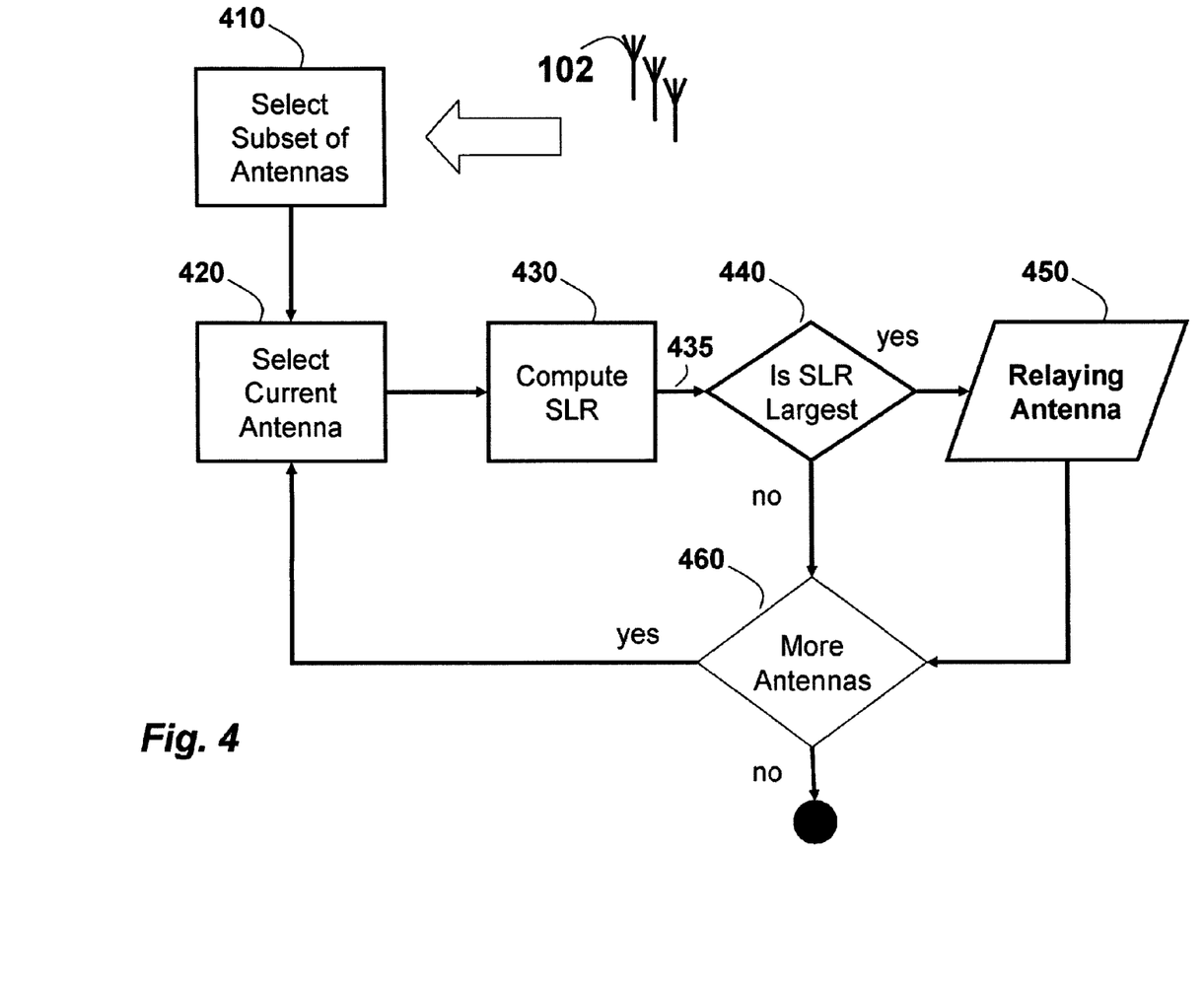
FIG. 4 is a flow chart of an optimal antenna allocation method according to the embodiments of the invention.

FIG. 4 shows a flow chart of the optimal antenna allocation method according to the embodiments of the invention. We select 410 a subset of the antennas out of the set of antennas 102. For example we can select neighbor antennas, e.g., two or five, closest antennas to the mobile device 103. Naturally, all antennas 102 could be selected 410. Further, for current antenna 420 of the subset 410 we compute 430 the SLR 435 according to Equation (5). If the SLR 435 is greater 440 than the SLR of the relaying antenna 450 we mark the current antenna 420 as the relaying antenna 450. The process is repeated 460 for all antennas in the subset 410.

After we select the antennas for each mobile device 103, $m_k$, we could determine 230 the average capacity 235 using Equation (4).

Power Allocation

The performance of the DAS 100 can be further improved by optimally allocating signal power 205 for each mobile device 103 and taking both signal and interference strengths into consideration. If the average signal power for each mobile, $p_k$, is $P_t$, than the average signal power for T mobile devices is $$\frac{1}{T}\sum_{i=1}^{T} p_k = P_t \text{ with } p_k \geq 0, k = 1, \ldots T.$$

Conventionally, the signal power is allocated to maximize the average capacity of all mobile devices 103:

$$C = \frac{1}{T}\sum_{i=1}^{T} E\left\{\log_2\left(1 + \frac{\beta_{m_k k}|h_{m_k k}|^2 P_k}{\sum_{i \neq k} \beta_{m_i k}|h_{m_i k}|^2 P_i + \sigma_N^2}\right)\right\}. \quad (6)$$

The implementation of the Equation (6) is complicated since the expectation should be taken over $h_{m_j k}$. Therefore, one embodiment of the invention instead of using the average capacity uses pseudo-capacity (PC) criterion to allocate the signal power, that is, allocate the power to maximize pseudo-capacity $C_{pc}$ $$C_{pc} = \frac{1}{T}\sum_{i=1}^{T} \log_2\left(1 + \frac{\beta_{m_k k} p_k}{\sum_{i \neq k} \beta_{m_i k} p_i + \sigma_N^2}\right). \quad (7)$$

The difference between Equation (6) and Equation (7) is that the expectation is removed from Equation (7) and $|h_{mik}|^2$ is substituted by its average.

Figure 5:
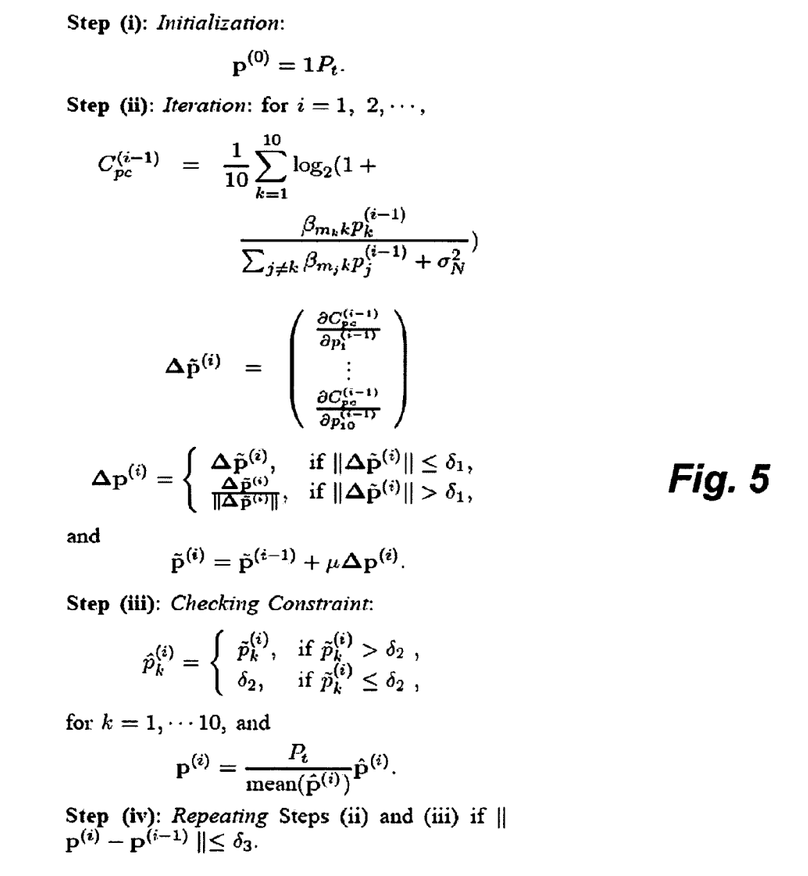
FIG. 5 is a pseudo code for an optimal power allocation method to maximize the capacity of the distributed antenna system according to the embodiments of the invention.

FIG. 5 show a pseudo code for an optimal power allocation method that finds the optimal power allocation to maximize $C_{pc}$. In the pseudo code of FIG. 5 $\delta_1$, $\delta_2$, and $\delta_3$ are small positive numbers and $\mu$ is step size, and T is the total number of mobile devices 103 using the same frequency is the DAS. The signal power 205 could be determine per transmission of a data package or per communication session.

EFFECT OF THE INVENTION

Figure 6:
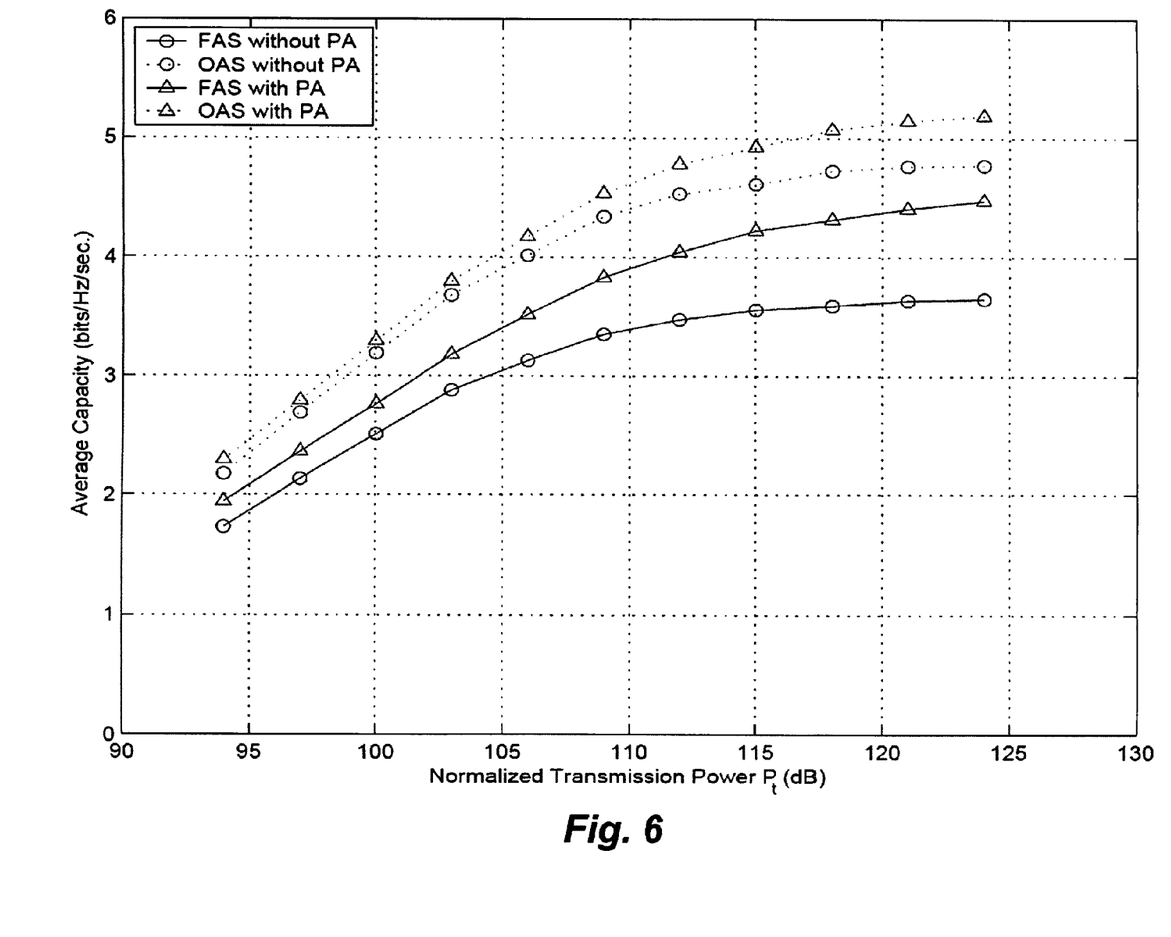
FIG. 6 shows results of computer simulations of different embodiments of the invention.

FIG. 6 shows results of computer simulations for different embodiments of the invention. In the simulations, the transmission (signal) power per Hz is normalized by the power spectral density of noise and determined when the path loss exponent of channel is $\alpha=3.5$ and the standard deviation of shadowing is $\sigma_s=8$ dB. When calculating the average capacity, the fast fading due to multipath is taken into consideration.

Results of simulations demonstrate that optimal antenna selection can improve the system performance compared with fixed antenna selection. Without power allocation, optimal antenna selection can increase the throughput by about 30% when the normalized signal power, $P_t=120$ dB. The pseudo-capacity based power allocation can further improve the DAS throughput, especially when there is no antenna selection.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

What claimed is:

1. A method for maximizing capacity of a distributed antenna system, comprising:

selecting a relaying antenna from a set of antennas of a distributed antenna system to relay a signal to a mobile device;

allocating a signal power based on a pseudo-capacity criterion such that an average pseudo capacity of the distributed antenna system is maximized; and relaying the signal from the relaying antenna to the mobile device with the allocated signal power, wherein the average pseudo capacity $C_{pc}$ is $$C_{pc} = \frac{1}{T} \sum_{k=1}^{T} \log_2 \left(1 + \frac{\beta_{m_k k} p_k}{\sum_{i \neq k} \beta_{m_i k} p_i + \sigma_N^2}\right),$$

where T is total number of mobile devices using same frequency in the distributed antenna system: $\sigma_N^2$ is an average power of the AWGN: $m_k$ is an index of the antenna m in the set of antennas used by the mobile device k; $\beta_{mk}$ is the power gain between the antenna m and the mobile device k; $p_k$ is a signal power at the antenna $m_k$ to relay signal to the mobile device k.

2. The method of the claim 1, wherein the selecting step is an optimal antenna selection.

3. The method of the claim 1, wherein the selecting step is a fixed antenna selection.

4. The method of the claim 2, wherein the optimal antenna selection comprising the steps of:

selecting a subset of antennas out of the set of antennas;

determining for each antenna in the subset of antennas a signal-to-leakage ratio (SLR) ratio; and selecting from the subset of antennas the relaying antenna with a maximum SLR ratio.

5. The method of the claim 4, wherein the subset of antennas is the set of antennas.

6. The method of the claim 4, wherein the subset of antennas consist of two closest antennas to the mobile device.

7. The method of a claim 4, wherein the SLR of an antenna in the subset of antennas for the mobile device k is $$SLR_k = \frac{\beta_{m_k k} P_t}{\sum_{i \neq k} \beta_{m_k i} P_t + \sigma_N^2},$$

where $P_t$ is the transmitted signal power; $\sigma_N^2$ is an average power of an additive white Gaussian noise (AWGN); $m_k$ is an index of the antenna m in the subset of antennas used by the mobile device k; and $\beta_{mk}$ is the power gain between the antenna in and the mobile device k.

8. The method of claim 1, wherein the allocating step uses an optimal power allocation method.

* * * * *